United States Patent
Dynes et al.

(10) Patent No.: US 9,240,276 B2
(45) Date of Patent: Jan. 19, 2016

(54) INDUCTION POWERED PANELS

(71) Applicant: GM Global Technology Operations LLC, Detroit, MI (US)

(72) Inventors: Paul R. Dynes, Bloomfield, MI (US); Tanner E. Goeson, Bowmanville (CA); Thomas D. Hagen, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 282 days.

(21) Appl. No.: 13/686,764

(22) Filed: Nov. 27, 2012

(65) Prior Publication Data

US 2014/0145501 A1    May 29, 2014

(51) Int. Cl.
   *H01F 38/14*    (2006.01)
   *B60L 11/18*    (2006.01)

(52) U.S. Cl.
   CPC .............. *H01F 38/14* (2013.01); *B60L 11/182* (2013.01); *Y02T 10/7005* (2013.01); *Y02T 90/122* (2013.01); *Y02T 90/14* (2013.01)

(58) Field of Classification Search
   CPC ............ Y02T 10/7005; Y02T 10/7077; Y02T 90/122; Y02T 90/14; B60R 16/03; B60L 11/14; B60L 11/182; H01F 38/14
   USPC .................................................. 307/9.1, 10.1
   See application file for complete search history.

(56) References Cited

U.S. PATENT DOCUMENTS

| | | | | |
|---|---|---|---|---|
| 2,944,145 | A * | 7/1960 | Legge | 362/322 |
| 2,976,495 | A * | 3/1961 | Unger | 331/181 |
| 4,063,517 | A * | 12/1977 | Nardozzi, Jr. | 104/35 |
| 4,630,043 | A * | 12/1986 | Haubner et al. | 340/461 |
| 6,042,385 | A | 3/2000 | Watanabe et al. | |
| 2002/0056233 | A1* | 5/2002 | Gohara | 49/360 |
| 2002/0117368 | A1* | 8/2002 | Ogasawara | 191/2 |
| 2002/0117897 | A1* | 8/2002 | Takahashi | 307/10.1 |
| 2002/0182898 | A1* | 12/2002 | Takahashi et al. | 439/39 |
| 2004/0005809 | A1* | 1/2004 | Suzuki | 439/485 |
| 2004/0134128 | A1* | 7/2004 | Berry et al. | 49/231 |
| 2005/0115151 | A1* | 6/2005 | Gevay | 49/141 |
| 2010/0320808 | A1* | 12/2010 | Marx et al. | 296/217 |
| 2011/0140479 | A1* | 6/2011 | Okada et al. | 296/146.1 |
| 2012/0032632 | A1* | 2/2012 | Soar | 320/108 |

FOREIGN PATENT DOCUMENTS

CN    102782985 A    11/2012

OTHER PUBLICATIONS

State Intellectual Property Office of the People's Republic of China, Office Action in Chinese Patent Application No. 201310610000.9 mailed Jun. 26, 2015.

* cited by examiner

*Primary Examiner* — Thienvu Tran
*Assistant Examiner* — Brian K Baxter
(74) *Attorney, Agent, or Firm* — Ingrassia Fisher & Lorenz, P.C.

(57) ABSTRACT

Vehicles and systems are provided. In accordance with one embodiment, for example, the vehicle may include, but is not limited to, a moveable panel comprising an electronic device, a power source, and a connector configured to selectively couple the movable panel to the vehicle, the connector configured to be electrically coupled to the power source and further configured to inductively couple the electronic device of the moveable panel to the power source.

17 Claims, 6 Drawing Sheets

INDUCTION POWERED PANELS

TECHNICAL FIELD

The technical field generally relates to vehicles, and more particularly relates to systems for inductively powering panels in vehicles.

BACKGROUND

Vehicles are increasingly becoming more complicated as more and more technology is included into vehicles. Each electronic device in the vehicle has to be coupled to a power source. The electronic devices are often coupled to a power source by a direct mechanical connection, such as a wire. However, when the electronic devices is in a panel which is moveable, such as a door or trunk, or removable, such as a removable roof top, the direct wired connections can complicate the installation process.

SUMMARY

In one embodiment, for example, a vehicle is provided. The vehicle may include, but is not limited to, a moveable panel comprising an electronic device, a power source, and a connector configured to selectively couple the movable panel to the vehicle, the connector configured to be electrically coupled to the power source and further configured to inductively couple the electronic device of the moveable panel to the power source.

In another exemplary embodiment, for example, a moveable panel configured to be coupled to a vehicle is provided. The moveable panel may include, but is not limited to, an electronic device, a first coupling element, the first coupling element configured to couple the moveable panel to the vehicle, the first coupling element comprising a first coil electrically coupled to the electronic device, and a second coupling element, the second coupling element configured to couple the moveable panel to the vehicle, the second coupling element comprising a second coil electrically coupled to the electronic device In yet another exemplary embodiment, for example, a vehicle is provided. The vehicle may include, but is not limited to, a power source, a connector electrically coupled to the power source. The connector may include, but is not limited to, a first connecting element, and a first coil wrapped around the first connecting element and electrically coupled to the power source. The vehicle may further include, but is not limited to, a moveable panel. The moveable panel may include, but is not limited to, a second connecting element, a second coil wrapped around the second connecting element, and an electronic device electrically coupled to the second coil, wherein the moveable panel is configured to be selectively coupled to the vehicle via the first connecting element and the second connecting element, and the power source is configured to inductively power the electronic device through the first coil and the second coil.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Modern vehicles have a variety of movable and removable parts such as doors, trunks and roofs. Many of the movable and removable parts house electronic devices, such as lights or displays or electronic systems such as motors for windows or locks. As discussed in further detail below, a system for inductively powering the electronic devices and systems is introduced. The inductive power system simplifies the assembly and maintenance of the vehicle and simplifies a process for removing and reattaching removable panels, such as a removable roof panel, which have an electronic device.

Figure 1:
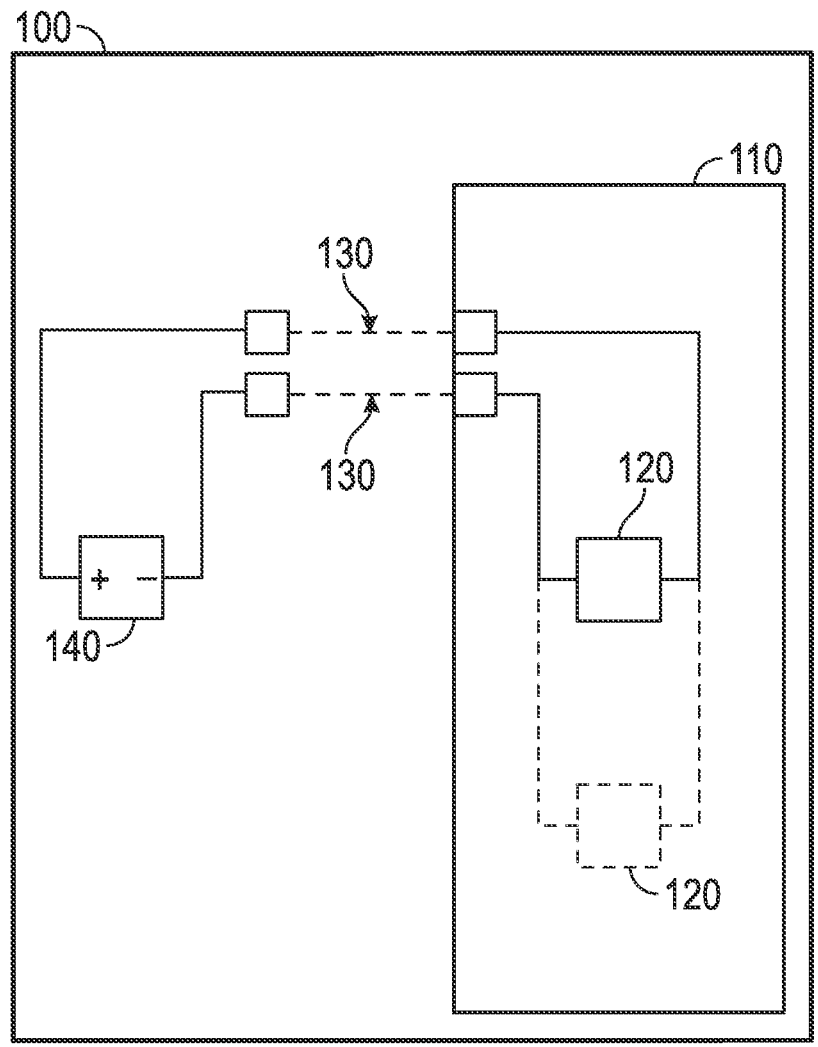
FIG. 1 is a block diagram of a vehicle, in accordance with an embodiment.

FIG. 1 is a block diagram of a vehicle 100, in accordance with an embodiment. The vehicle 100 may be any type of vehicle, including, but not limited to, automobiles, aircraft, spacecraft, marine vehicles, or the like. The vehicle 100 includes at least one moveable panel 110. The moveable panel 110 may be, for example, a door, a trunk, a lift gate, a convertible top, a headrest or the like. In one embodiment, for example, the moveable panel 110 may be removable from the vehicle 100 entirely. For example, the moveable panel 110 may be a removable roof panel or a removable headrest.

The moveable panel 110 includes at least one electronic device 120. The electronic device 120 may be any device which requires electricity. In one embodiment, for example, if the moveable panel 110 is a removable roof panel or a convertible top, the electronic device 120 may be a dome light. In other embodiments, for example, if the moveable panel 110 is a door, the electronic device 120 may be a motor and control system for controlling the movement of a window in the door or an electronic door locking system. The electronic device 120 could also be a brake light, an electro-polymer sunshade, an electrochromic device, a suspended particle device or liquid crystal display (LCD). In yet other embodiments, for example, the electronic device 120 may be a defrosting system.

The moveable panel 110 is coupled to the vehicle 100 by at least one connector 130. Each connector 130 has two connecting elements, one connected to the car and one connected to the moveable panel 110. The connectors 130 are used to couple the movable panel 110 to the vehicle and to provide power for the electronic device 120. Each connector 130 is coupled to a power source 140 on the vehicle. The power source 140, for example, could be a battery or the power could be supplied by a motor on the vehicle, or a combination thereof. One of the connectors 130 is coupled to a first side of the power source and the other connector is coupled to a second side of the power source. Accordingly, when the moveable panel 110 is coupled to the vehicle 100, a complete circuit is formed, allowing the transfer of current, as discussed in further detail below. Many different styles of connectors 130 could be used. In one embodiment, for example, a hinge may be used as the connector. The hinge, for example, may connect a door or a trunk to the vehicle 100.

Figure 2:
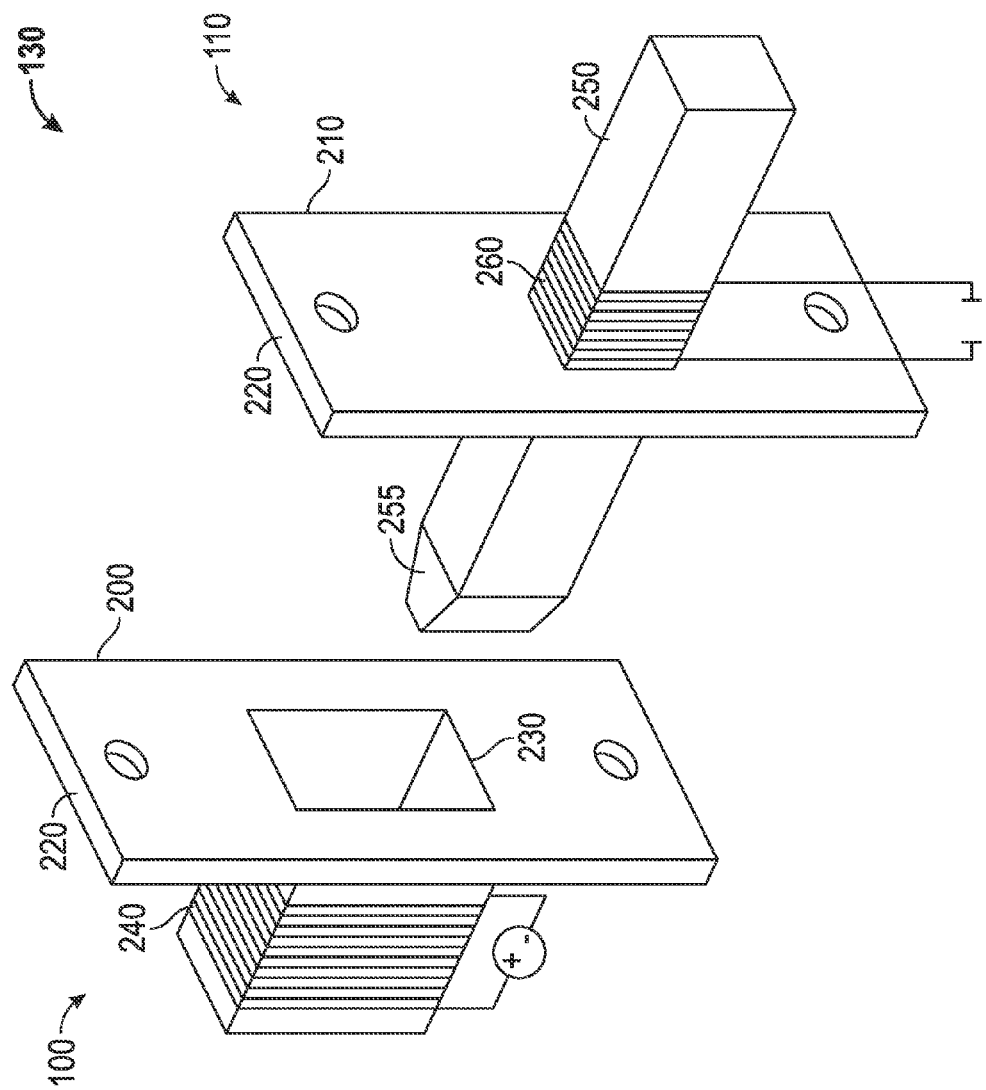
FIG. 2 is a perspective view of an exemplary connector in accordance with an embodiment.

FIG. 2 is a perspective view of an exemplary connector 130 in accordance with an embodiment. The connector 130 includes a connecting element 200 coupled to the vehicle 100 and a connecting element 210 coupled to the moveable panel 110. In one embodiment, for example, the connecting elements 200 and 210 may be coupled to the vehicle 100 via one or more mounting elements 220. The mounting elements, for example, may be coupled to the vehicle 100 or moveable panel 110 via screws via one or more holes in a face of the mounting elements 220. In other embodiments, for example, the connecting elements may be welded, press fit, or connected to the respective vehicle 100 or moveable panel 110 in any other fashion.

The connecting element 200 includes a receptacle 230. While the receptacle 230 illustrated in FIG. 2 is substantially rectangular, one of ordinary skill in the art would recognize that the receptacle 230 could be shaped in a variety of ways, including, but not limited to, circular, oval, square or any other polygon. In one embodiment, for example, the receptacle 230 may have a depression for receiving hooks or other attachment features of the connecting element 210. The receptacle 230 extends away from the mounting element 220 of the connecting element 200. A coil 240 is wound around the receptacle 230. The coil 240 may be formed by a wire made of any conductive material. The coil 240 is connected to a power source, such as the power source 140 illustrated in FIG. 1, as discussed in further detail below.

The connecting element 210 includes an interface 250. The interface 250 is configured to couple with the receptacle 230. Accordingly, the shape of the interface 250 corresponds to a shape of the receptacle 230. In one embodiment, for example, an end 255 of the interface 250 may be tapered to ease the coupling between the connecting elements 200 and 210. In other embodiments, for example, the end 255 may include a hook, or other mechanism for securing the connecting element 210 to the connecting element 200. The interface 250 may be made from any ferrous material, including, but not limited to, iron, steel or any other alloy which includes iron.

The connecting element 210 also has a coil 260 wrapped around a portion of the interface 250. The coil 260 is coupled to one or more electronic devices. When power is applied to the coil 240 from a power source, the coil 240 and coil 260 inductively couple. In other words, a current flowing through the coil 240 induces a current in the coil 260, which can be used to power the electronic devices. Because the power for the electronic devices is passed to the movable panel 110 inductively rather than via wires, the assembly of the vehicle is simplified. Further, because the power for electronic devices is passed inductively, the moveable panels can be removed from the vehicle and later reinstalled on the vehicle without having to worry about a wire harness. Furthermore, unlike certain mechanical connections which need to be precise and which are subject to corrosion, the position of the coils 240 and 260 with respect to one another does not have to be precise to function.

Figure 3:
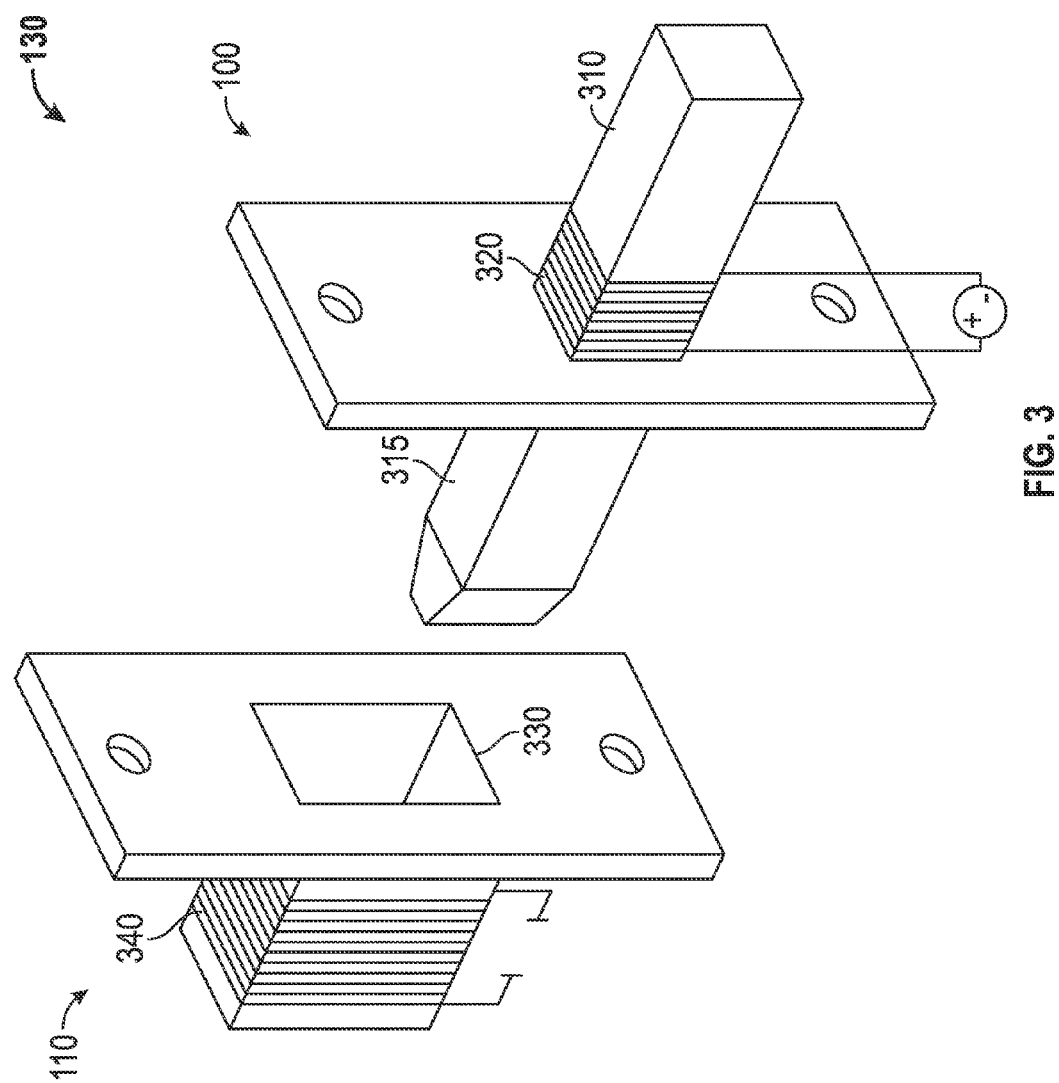
FIG. 3 is a perspective view of another exemplary connector in accordance with an embodiment.

While FIG. 2 illustrates a vehicle 100 having a connecting element 200 with a receptacle 230 and a moveable panel 110 having a connecting element 210 with an interface 250, one of ordinary skill in the art would recognize that the configuration can be reversed. FIG. 3 is a perspective view of another exemplary connector 130 in accordance with an embodiment. As seen in FIG. 3, the vehicle 100 includes a connecting element 310 having an interface 315 with a coil 320. The coil 320 is coupled to a power source in the vehicle. The moveable panel 110 include a receptacle 330 having a coil 340 coupled to one or more electronic devices.

Figure 4:
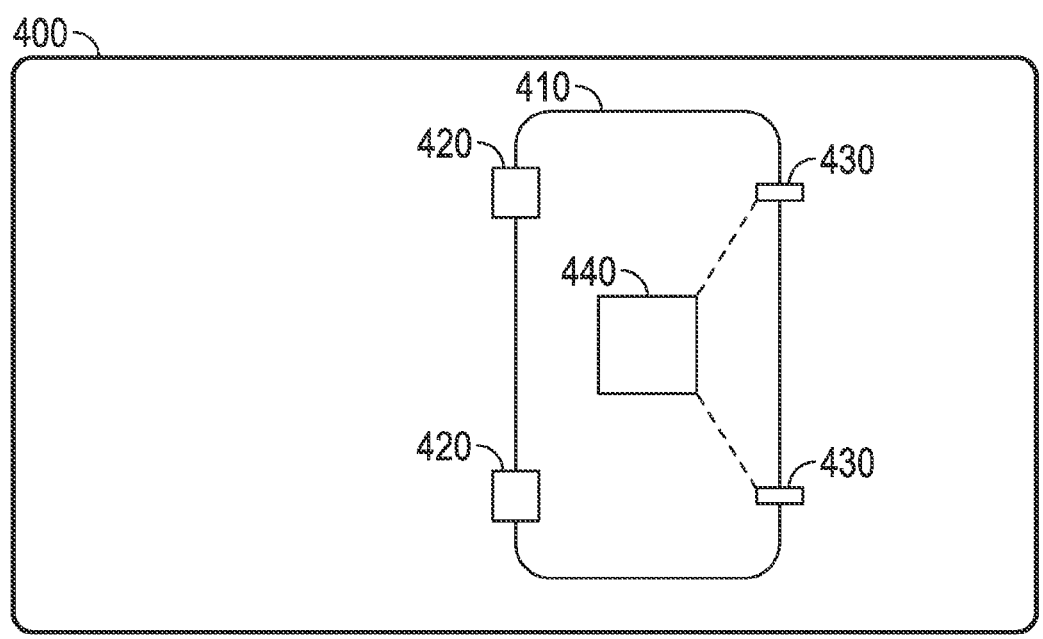
FIG. 4 illustrates an exemplary vehicle in accordance with an embodiment.

FIG. 4 illustrates an exemplary vehicle 400 in accordance with an embodiment. The vehicle 400 includes a removable roof panel 410. The removable roof panel 410 can be removed from the vehicle to convert the vehicle into a convertible. The vehicle 400 includes at least one locking mechanism 420 and at least one connector 430 which coupled the removable roof panel 410 to the vehicle. The vehicle 400 further includes at least one electronic device 440.

Figure 5:
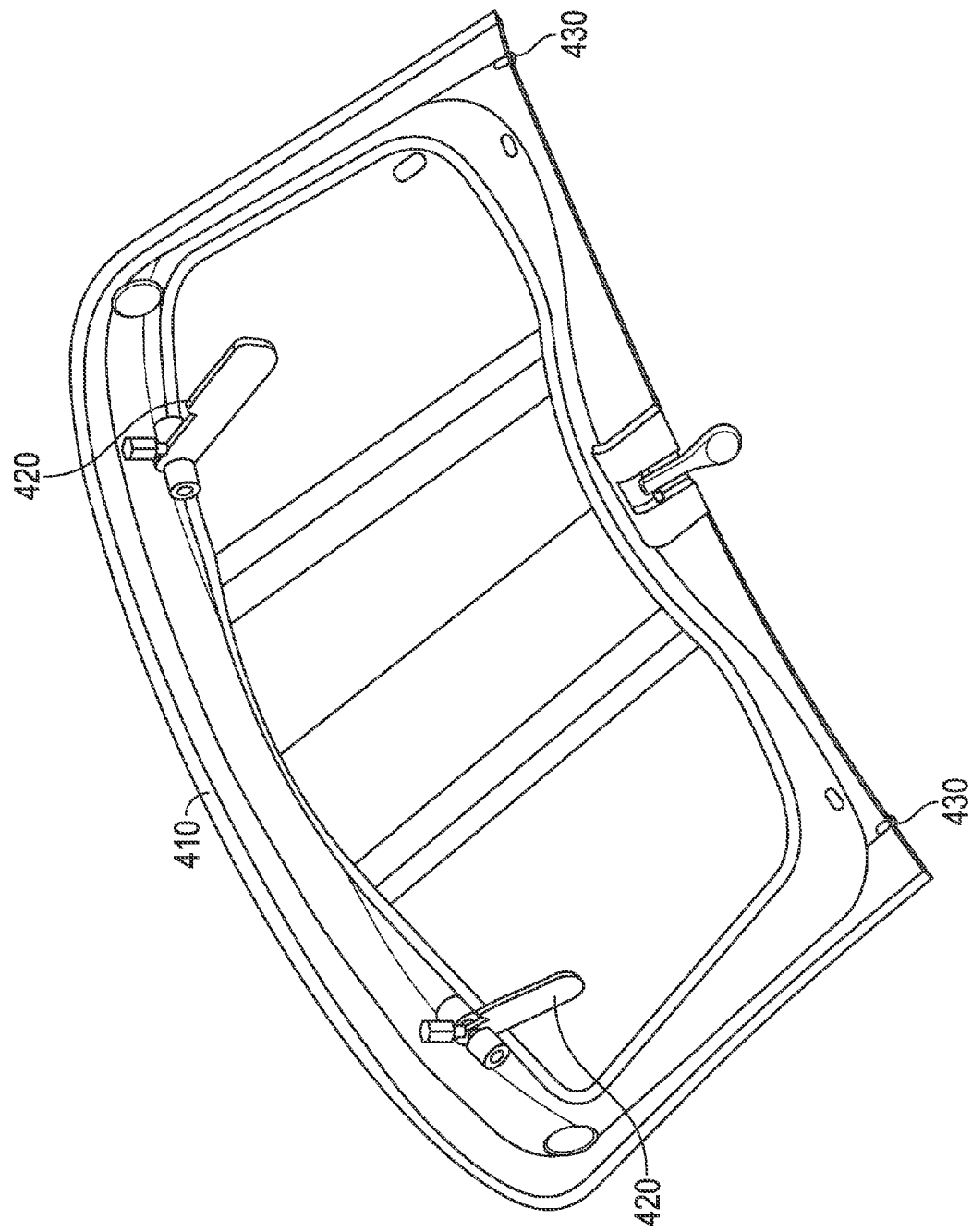
FIG. 5 is a perspective view of exemplary removable roof panel in accordance with an embodiment.

FIG. 5 is a perspective view of exemplary removable roof panel 410 in accordance with an embodiment. As discussed above, the removable roof panel 410 includes at least one locking mechanism 420 and at least one connector 430 which coupled the removable roof panel 410 to the vehicle. In this exemplary embodiment, the locking mechanism 420 is a rotatable latch than can manually be rotated around an axis to hold the removable roof panel 410 in place on the vehicle or to unlock the removable roof panel 410 from the vehicle.

The connector 430 functions as both a guide pin and for inductively transferring power. When the removable roof panel 410 is connected to the vehicle, the connector 430 ensures that the removable roof panel 410 is aligned properly, ensuring that the removable roof panel 410 is properly seated on the roof of the vehicle and that the locking mechanisms 420 are aligned with corresponding areas on the vehicle.

Figure 6:
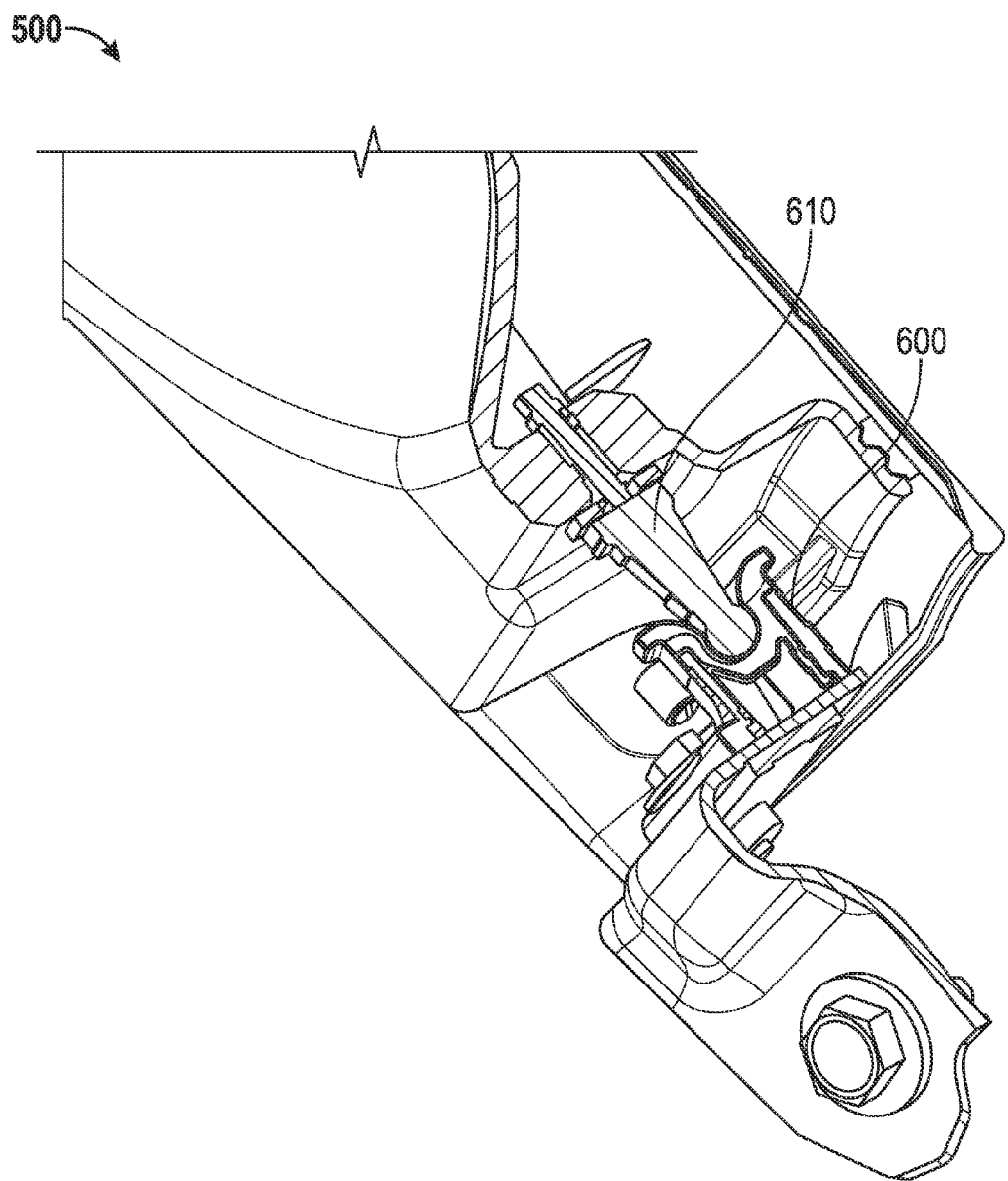
FIG. 6 is a cutaway view of the exemplary connector illustrated in FIGS. 4 and 5.

FIG. 6 is a cutaway view of the exemplary connector 500 illustrated in FIGS. 4 and 5. The connector 500 includes a connecting element 600 coupled to the vehicle 400 and a connecting element 610 coupled to the removable roof panel 410. As seen in FIG. 6, in this embodiment the connecting element 600 is substantially bowl shaped, with a tapered entry to help guide the connecting element 610 into the correct position. In one embodiment, for example, the connecting element 610 has a rounded front end. The rounded front end, as illustrated in FIG. 6, helps the connecting element 610 slide into the correct position within the connecting element 600. In one embodiment, for example, the connecting element 610 may include a ferrous material. Furthermore, a coil (not illustrated) may be wrapped around each of the respective connecting elements 600 and 610. In one embodiment, for example, the coil wrapped around the connecting element 610 may be covered in a protective coating to prevent the coil from becoming damaged when the connecting elements are coupled. Accordingly, when the connecting elements 600 and 610 are coupled together, the coils can inductively couple providing power to an electronic device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A vehicle, comprising:
 a moveable panel comprising an electronic device;
 a power source; and
 a connector configured to selectively couple the movable panel to the vehicle, the connector configured to be electrically coupled to the power source and further configured to inductively couple the electronic device of the moveable panel to the power source, the connector comprising:
  a first connecting element coupled to the vehicle, the first connecting element shaped substantially as a bowl;
  a first coil electrically coupled to one of the power source and the electronic device, the first coil coiled around an outside of the bowl of the first connecting element;
  a second connecting element coupled to the moveable panel, the second connecting element having a tapered body and a substantially ball shaped front end, the substantially ball shaped front end configured to rest in the bowl of the first connecting element; and
  a second coil electrically coupled to the other of the power source and the electronic device, the second coil coiled around the tapered body of the second connecting element.

2. The vehicle of claim 1, wherein the first connecting element includes a ferrous material.

3. The vehicle of claim 1, wherein the moveable panel is configured to be removed from the vehicle.

4. The vehicle of claim 3, wherein the moveable panel is a roof.

5. The vehicle of claim 4, wherein the electronic device is a dome light.

6. The vehicle of claim 1, wherein the moveable panel is a door.

7. The vehicle of claim 6, wherein the door is a sliding door.

8. A moveable panel configured to be coupled to a vehicle, comprising:
  an electronic device;
  a first coupling element, the first coupling element being shaped substantially as a bowl and configured to couple the moveable panel to the vehicle, the first coupling element comprising a first coil coiled around an outside of the bowl and electrically coupled to the electronic device; and
  a second coupling element, the second coupling element having a tapered body and a substantially ball shaped front end, the substantially ball shaped front end configured to rest in the bowl of the first connecting element, the second coupling element further comprising a second coil coiled around the tapered body of the second connecting element and electrically coupled to the electronic device.

9. The moveable panel of claim 8, wherein the first coupling element further comprises an interface comprising a ferrous material, wherein the first coil is wrapped around the interface.

10. The moveable panel of claim 8, wherein the moveable panel is a door.

11. The moveable panel of claim 8, wherein the moveable panel is a roof.

12. The moveable panel of claim 11, wherein the electronic device is a dome light.

13. A vehicle, comprising:
  a power source;
  a connector electrically coupled to the power source, the connector comprising:
    a first connecting element shaped substantially as a bowl, and
    a first coil wrapped around an outside of the bowl of the first connecting element and electrically coupled to the power source; and
  a moveable panel, the moveable panel comprising:
    a second connecting element having a tapered body and a substantially ball shaped front end, the substantially ball shaped front end configured to rest in the bowl of the first connecting element,
    a second coil wrapped around the tapered body of the second connecting element, and
    an electronic device electrically coupled to the second coil,
  wherein the moveable panel is configured to be selectively coupled to the vehicle via the first connecting element and the second connecting element, and the power source is configured to inductively power the electronic device through the first coil and the second coil.

14. The vehicle of claim 13, wherein the moveable panel is a roof and the electronic device is a dome light.

15. The vehicle of claim 13, wherein the electronic device is an electro-polymer sunshade.

16. The vehicle of claim 13, wherein the electronic device is a liquid crystal display.

17. The vehicle of claim 13, wherein the electronic device is at least one brake light.

* * * * *